Dec. 13, 1966  H. F. SCHNEIDER ET AL  3,291,612
METHOD FOR COLLECTING AND PRESERVING BLOOD
Filed Dec. 2, 1963
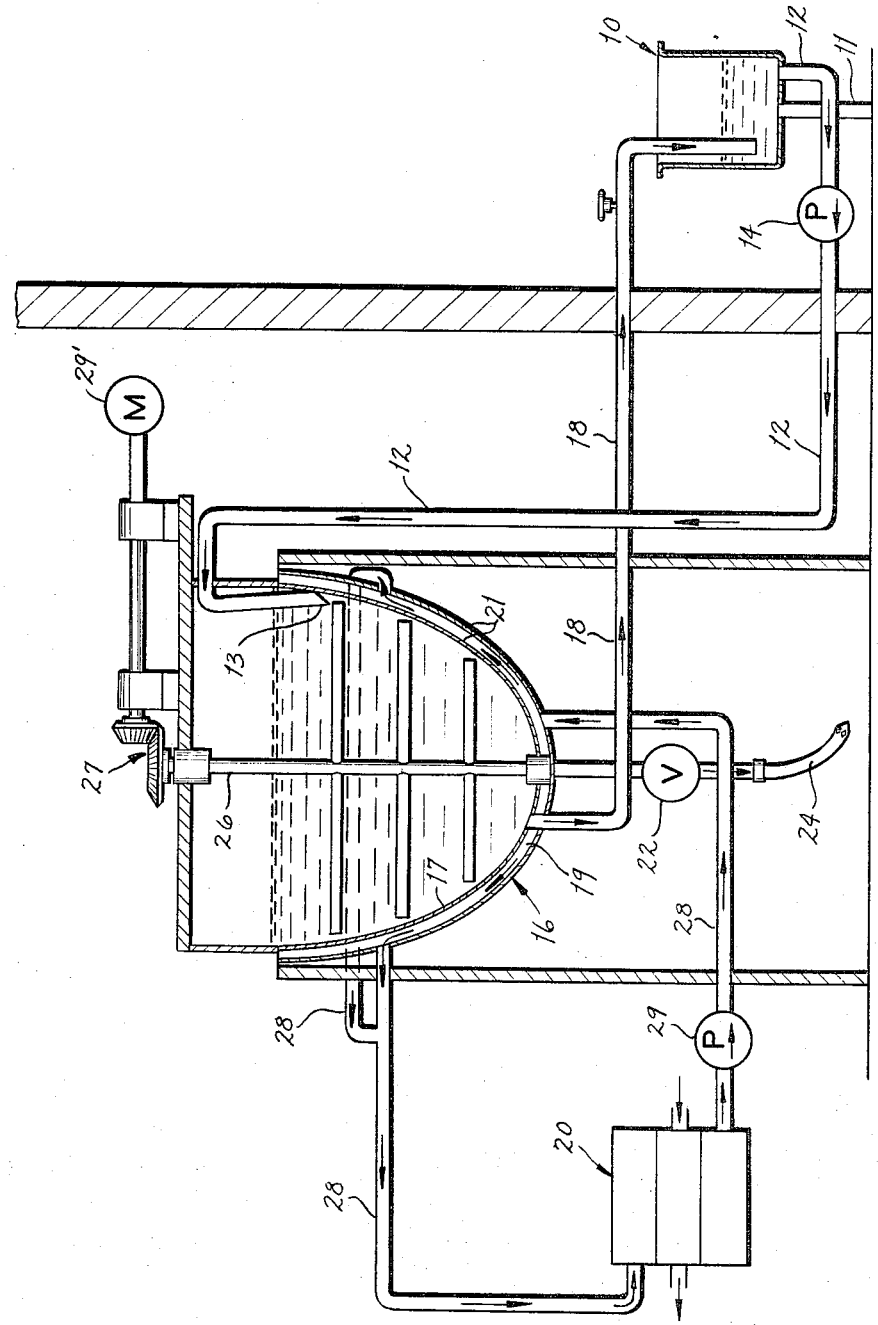
INVENTORS
HAROLD F. SCHNEIDER AND NORVEL F. GAMEL
BY
ATTORNEY

United States Patent Office 3,291,612
Patented Dec. 13, 1966

3,291,612
METHOD FOR COLLECTING AND
PRESERVING BLOOD
Harold F. Schneider and Norvel F. Gamel, St. Louis, Mo., assignors to Schneider Packing Company, St. Louis, Mo., a corporation of Missouri
Filed Dec. 2, 1963, Ser. No. 327,245
3 Claims. (Cl. 99—21)

The present invention relates to apparatus and method for collecting and preserving blood used in the preparation of animal feed and the like, and more particularly to the quick-cooling of fresh blood by introducing it into a refrigerated reservoir of continuously circulated anti-coagulant solution. Such blood is stored in large quantities and shipped to processors for use in the production of animal feed, for example mink feed.

In the field of cattle slaughtering, it has been the general practice to collect blood during the bleeding operation and process the collected blood into granular fertilizer and/or animal feed. A newly slaughtered animal was hung head downward; its blood drained into buckets placed on the floor of the bleeding room. An anti-coagulant solution at room temperature was provided in the buckets to prevent coagulation of the blood during the bleeding process. After the bleeding operation, the buckets of fresh blood were emptied into a storage barrel, which when finally filled was removed from the bleeding room and placed in a refrigeration room where it was stored until shipped to a processor.

Although this former method of collecting and preserving blood serves the purpose for preparing fertilizer, it has not proved satisfactory for preparing animal feed in that undesirable spoilage, foaming and coagulation of the blood has been experienced. Also, excessive foaming of the blood by this collection method has resulted in the shipment of storage barrels which are less than half full.

Coagulation of the blood brought about by such prior art method of collection is due in part to the placing of the collecting buckets on the floor of the bleeding room. This floor is continuously flooded by running water which reduces the temperature of the collected blood to its coagulating temperature before the anti-coagulant solution is thoroughly mixed therewith. Spoilage of from 60% to 70% of the total amount of blood collected in this manner is also encountered. This spoilage is due in part to the stomach bacteria which drains from the mouth of the animal into the blood collecting buckets. Spoilage also results because the storage barrels remain in the unrefrigerated "bleeding room" until filled.

The above described prior art method of blood collection and preservation also produces excessive foaming because the warm blood tends to foam vigorously when added to the anti-coagulant solution at bleeding room temperatures. This foaming is further enhanced by the agitation caused by the blood dropping from the incision to the collecting bucket, this drop exceeding three feet in most instances.

The general purpose of this invention is to provide a method of collecting and preserving blood for use in preparing animal feed which possesses none of the aforedescribed disadvantages. It is therefore the purpose of this invention to:

Provide a method of collecting and preserving blood in large quantities wherein there is substantially no spoiling of the blood;

Provide a method of collecting and preserving blood for animal feeding and the like wherein there is substantially no coagulation of the blood;

Provide a method of collecting and preserving blood for animal feeding wherein foaming of the blood is reduced to a minimum thereby permitting complete filling of storage barrels; and Provide apparatus for collecting and preserving blood which receives and continuously refrigerates, circulates, and mixes the blood without supervision and in the absence of foaming and spoilage.

In the present invention, these purposes (as well as other apparent herein) are achieved generally as follows:
An anti-coagulant solution comprising sodium citrate and water is introduced into a blood receiving vat and continuously circulated through a system including the receiving vat and a large refrigerated storage vat. Hooks are attached to that portion to the animal's throat which is in close proximity to the incision. Empty (that is, without any anti-coagulant solution) blood collecting buckets are hung on the hooks and positioned to receive the blood draining from the incision. Blood collected in the buckets is poured into the circulating fluid in the receiving vat before the blood has an opportunity to cool to the coagulating temperature. The fresh blood is quickly cooled upon contact with the circulating refrigerated fluid in the receiving vat, which fluid includes the original anti-coagulant solution and all blood previously poured into the receiving vat.

The present invention provides apparatus which operates continuously during this slaughtering process without supervision. It includes: A first reservoir in the slaughtering room which receives blood taken from the freshly slaughtered animals. A second reservoir of larger capacity is positioned in a room remote from the slaughtering room and at a height above that of the first reservoir. This permits gravity feed of the fluid in the larger reservoir to the smaller reservoir. This larger reservoir is provided with means for refrigerating and mixing the fluid contained therein. First and second conduit means connect the reservoirs and communicate with the interiors thereof to permit fluid flow in both directions.

To facilitate the understanding of my novel apparatus and method of collecting and preserving blood drained from slaughtered cattle, a description of preferred apparatus and their interconnections will now be given with reference to the figure, a diagrammatic sketch of such apparatus. A stainless steel receiving vat 10 having a capacity of approximately 20 gallons is connected by conventional piping 12, including a centrifugal pump 14 to a large storage vat 16. The receiving vat 10 is located in the bleeding room convenient to the draining rack and has an ingress opening of sufficient size to permit ready emptying of three-gallon buckets into the vat. This vat 10 is mounted above the floor on support 11. A return gravity feed pipe 18 also connects the storage vat 16 and the receiving vat 10. The storage vat 16 is supported above the vat 10 so that fluid may be gravity fed through pipe 18. This feed pipe 18 may optionally include a solenoid-operated valve (not shown) actuated by a liquid level sensor (not shown) in the receiving vat 10 to maintain the liquid in vat 10 at some maximum level. Under normal operating conditions, the rate of flow is limited by the pipe 18, regardless of the depth to which the vat 16 is filled, thereby allowing the pump 14 to maintain the level of fluid in vat 10.

The large storage vat 16 is preferably of copper construction with an inner lead lining 17. It has a capacity upwards of 800 gallons and is located remotely from the bleeding room. The spaced apart copper and lead lining permits refrigerant, for example brine 19, to flow therebetween. This refrigerant cools the contents of storage vat 16. Piping 28 connects vat 16 with a refrigeration unit 20 and transports refrigerant to and from the jacketed lining 21 of the vat. The supply portion of piping 28 enters the jacketed lining 21 near the bottom of the tank, and the return portion enters the lining near the top of the larger vat. A pump 29 pumps refrigerant from the refrigeration unit 20 to the vat 16 and it is gravity fed back to the unit. Positioned below the large storage vat 16 is a manually-operated valve 22 which controls the flow of fluid from the storage vat to a flexible hose 24 used in filling shipping barrels (not shown).

The storage vat 16 is also provided with a mixer 26 preferably a motor driven paddle-mixer which continually mixes the contents of vat 16. The mixer 26 is driven through gear means 27 by motor 29' to circulate the fluid in the vat 16 continuously in one direction. End 13 of piping 12 is directed toward the interior wall of the vat 16. The end 13 is also tilted from the vertical so that the fluid flowing therefrom is thinned out over the wall and enters the circulating fluid flowing in a direction opposed to that of the circulating fluid. This thinning and swirling of the fluid over the interior wall of vat 16 prevents foaming at this point in the system.

Each day before the slaughtering of cattle (usually steers, heifers, bulls and cows) begins, the number to be slaughtered is determined. From this determination and knowing that the average amount of blood to be collected from each animal is about 2½ gallons, the total amount of blood to be collected that day can be approximated. For each 500 gallons of blood approximated, 15 pounds of granulated sodium citrate, an anti-coagulant and preservoir, is dissolved in approximately 10 gallons of water. The sodium citrate-water solution is poured into the blood receiving vat 10 and pumped by the conventional centrifugal pump 14 to the storage vat 16. At the storage vat the sodium citrate solution is cooled by the refrigerant flowing from refrigeration unit 20 to the lining of vat 16. Preferably the refrigerant 19 reduces the temperature of the solution from room temperature to approximately 33° F. The return gravity feed pipe 18 returns the cooled sodium citrate solution to the receiving vat 10 from which point the cycle is repeated. Thus, the sodium citrate solution is continuously circulated between the receiving reservoir 10 and the refrigerated storage reservoir 16.

Blood flowing from slaughtered cattle proceeds from throat incisions, with the cattle hung on the bleeding racks, heads downward. Empty buckets, each having a capacity of approximately 3 gallons, are hung on the hooks inserted adjacent to the incision so as to bring the top of the buckets within a few inches of the incision: By positioning a bucket in this manner, it is free to swing and remain directly below the incision even though the animal is moved along the bleeding line for further processing. Fresh beef blood has a temperature ranging from about 98° F. to about 100° F. and coagulation thereof occurs at about 80° F. Since the buckets are kept off the cool floor and not subjected to cooling by water flowing over the floor, there is no need for an anti-coagulant solution (such as sodium citrate solution) in the bottom of the buckets. The bleeding room air temperature as maintained for ordinary work does not quickly chill the blood, and it does not therefore coagulate.

Immediately after substantial blood draining has ceased, the buckets are unhooked from the throats of the cattle and the fresh, warm blood poured into the blood receiving vat 10. There the warm blood commingles with the circulating refrigerated sodium citrate solution without substantial foam being produced. The pump 14 provides continuous circulation of the sodium citrate solution from the receiving vat to the storage vat, such circulation providing rapid mixing of the fresh blood with the refrigerated anti-coagulant solution. The commingled solution of fresh blood and sodium citrate solution flows to the storage vat where it is introduced by directing it against the wall of the vat and into the circulating sodium citrate solution as hereinabove described. The conventional paddle-mixer 26 vigorously mixes the liquid. It is simultaneously cooled in the vat 16 by the transfer of heat to the refrigerant 19 flowing through the jacketed lining 21. Recirculation of the mixture continues, a part of the contents of the storage vat 16 being constantly directed back through the receiving vat 10, pump 14 and piping 12.

Additional fresh blood is then drained from slaughtered animals as hereinabove described. Before cooling to its coagulating temperature, it is promptly poured into the receiving vat 10 where it is commingled with the recirculating, refrigerated blood-sodium citrate mixture.

At the end of the day when the anticipated collection of blood has been gathered, the tapping valve 22 of the storage vat 16 may be opened, permitting gravity feed of the stored blood into shipping barrels. The shipping barrels are filled to the top, sealed, and loaded on refrigerated vehicles for shipment to the blood processor.

By the above described process, fresh blood which is collected at a temperature of 100° F. is quickly cooled by introduction into a refrigerated reservoir of continuously agitated anti-coagulant solution. It is thoroughly mixed and preserved at a temperature which prevents spoilage of the blood. Since the blood must be maintained fluid at a temperature less than 42° F. to prevent spoilage, the refrigeration unit capacity is chosen such that even when the storage vat is filled, the temperature of the fluid circulating in the system is maintained between 32° F. and 42° F., preferably at about 36° F.

By promptly pouring the fresh warm blood into the refrigerated system, instead of permitting it to stand at room temperature in large containers, coagulation and spoilage thereof is prevented. Furthermore, substantially no foaming of the blood occurs by processing it in the aforedescribed manner, thereby enabling one to completely fill the shipping barrels and reduce the number required. Additionally, by attaching the bucket directly to the animal's neck during the bleeding process, the collection of blood does not delay conveying the slaughtered animals along a processing line. Also, contaminates (such as may fall from the animal's mouth during bleeding) cannot drip into the buckets.

Obviously, many modifications and variations of the present invention are possible in the light of the above teachings. It is therefore to be understood, that within the scope of the appended claims, the invention may be practiced otherwise than as specifically described.

We claim:

1. The method of collecting and preserving the blood of slaughtered cattle pending shipment, comprising the steps of collecting the fresh warm blood from newly slaughtered cattle, while so collecting, retaining the collected blood above the coagulating temperature of substantially 80° F. and between such temperature and blood heat of such cattle, then pouring said collected retained blood into a circulating refrigerated solution containing an anti-coagulant and held at a temperature below 42° F. and above freezing, thereby quickly cooling the blood and avoiding foaming, then continuously mixing and refrigerating the mixture to hold it within said temperature range, and then transferring same to and filling a shipping receptacle, whereby same is filled substantially without foam.

2. The method of collecting and preserving the blood of cattle suspended head downwardly and slaughtered by throat incision, comprising the steps of suspending a receptacle from the slaughtered animal closely below such incision, whereby blood may drain therein, and collecting the blood in such suspended receptacle, retaining the collected blood above its coagulating temperature and between such temperature and blood heat of the cattle, in a separate system circulating liquid including an anti-coagulant solution and refrigerating the circulating liquid to hold it within a temperature range above freezing and below spoilage temperature for such blood, then pouring the blood so collected and retained into the refrigerated liquid, thereby quickly cooling the blood to said temperature range and thereby avoiding foaming, and then continuously mixing the blood with such liquid and refrigerating the mixture to hold it within said temperature range.

3. The method of collecting and preserving a batch of blood of slaughtered catttle pending shipment, comprising the steps of preparing a batch of anti-coagulant solution sufficient for the anticipated batch quantity of blood to be collected and mixed therewith, refrigerating such solution to within a temperature range between freezing temperature and 42° F., continuously circulating the refrigerated solution, independently collecting the blood of freshly slaughtered cattle and retaining same between blood heat and a temperature above coagulating temperature, then pouring such collected blood into the refrigerated circulating anti-coagulant solution, thereby quickly cooling the blood to said temperature range of the refrigerated solution and avoiding foaming, continuously mixing the blood with such solution and refrigerating the mixture to hold it within said temperature range, meanwhile collecting additional blood and retaining it between blood heat and above coagulating temperature, then pouring said additional blood into the refrigerated mixture and quickly cooling same to said refrigerated temperature range, thereby to avoid foaming, and continuing mixing and refrigerating the mixture to hold it within said temperature range, until the entire batch of blood to be collected has been so mixed and quickly cooled and mixed into the refrigerated batch of anti-coagulant solution.

References Cited by the Examiner
UNITED STATES PATENTS

| | | | |
|---|---|---|---|
| 1,804,042 | 5/1931 | Wescott | 99—21 |
| 1,855,658 | 4/1932 | Whipple et al. | 128—276 |
| 1,963,097 | 6/1934 | Poe | 128—276 |
| 2,165,722 | 7/1939 | Norman | 99—21 |
| 2,422,194 | 6/1947 | Harrington | 99—21 |
| 2,647,514 | 8/1953 | Ellis | 128—214 X |

OTHER REFERENCES

Wintrobe: "Clinical Hematology," 1946, Second edition, published by Lea and Febiger, Philadelphia, p. 310.

Strumia: "Science," October 14, 1949, vol. 110, pp. 398 and 399 and article entitled Freezing of Whole Blood.

A. LOUIS MONACELL, *Primary Examiner.*

HYMAN LORD, *Examiner.*